(12) United States Patent
Ben Shoshan et al.

(10) Patent No.: US 11,505,225 B2
(45) Date of Patent: Nov. 22, 2022

(54) CARRYING DEVICE AND A SYSTEM COMPRISING THE SAME

(71) Applicant: Inodens Ltd., Kibbutz Yiftah (IL)

(72) Inventors: Amir Ben Shoshan, Kibbutz Yiftah (IL); Asaf Engel, Kibbutz Yiftah (IL)

(73) Assignee: Inodens Ltd., Kibbutz Yiftah (IL)

( * ) Notice: Subject to any disclaimer, the term of this patent is extended or adjusted under 35 U.S.C. 154(b) by 449 days.

(21) Appl. No.: 16/743,168

(22) Filed: Jan. 15, 2020

(65) Prior Publication Data

US 2020/0223461 A1 Jul. 16, 2020

Related U.S. Application Data

(60) Provisional application No. 62/792,929, filed on Jan. 16, 2019.

(51) Int. Cl.
*B62B 1/12* (2006.01)
*A45F 3/14* (2006.01)
*B62B 5/00* (2006.01)
*B62B 1/20* (2006.01)

(52) U.S. Cl.
CPC ............... *B62B 1/12* (2013.01); *A45F 3/14* (2013.01); *B62B 5/0023* (2013.01); *A45F 2003/142* (2013.01); *B62B 1/208* (2013.01)

(58) Field of Classification Search
CPC .. B62B 1/12; B62B 1/208; B62B 1/20; B62B 5/0023; B62B 5/068; A45F 3/14; A45F 2003/142
See application file for complete search history.

(56) References Cited

U.S. PATENT DOCUMENTS

| | | | |
|---|---|---|---|
| 8,419,035 B2 * | 4/2013 | Wilson | B62K 27/12 280/204 |
| 9,365,224 B1 * | 6/2016 | Koshutin | B62B 5/0023 |
| 2017/0135332 A1 * | 5/2017 | Doyle | B62B 5/068 |
| 2020/0180673 A1 * | 6/2020 | Kelling | B62B 1/10 |
| 2020/0283050 A1 * | 9/2020 | Johnson | B62B 7/126 |

FOREIGN PATENT DOCUMENTS

CN 202686396 U * 1/2013
EP 0719511 A1 * 12/1995

* cited by examiner

*Primary Examiner* — John D Walters
(74) *Attorney, Agent, or Firm* — Blue Filament Law PLLC

(57) ABSTRACT

A carrying device is provided that includes a load compartment configured to accommodate a load; at least one wheel rotatably coupled to the load compartment and configured to roll along a ground; a shaft attached to the load compartment; and a coupling element attached the shaft. The coupling element is configured to couple the carrying device to a person in a manner that allows towing of the carrying device by the person. Additional versions of the carrying device and a system including the same are also disclosed.

16 Claims, 13 Drawing Sheets

CARRYING DEVICE AND A SYSTEM COMPRISING THE SAME

CROSS-REFERENCE TO RELATED APPLICATION

This application claims priority to U.S. Provisional Patent Application No. 62/792,929, filed Jan. 16, 2019, the entire contents of which is incorporated herein by reference in its entirety.

FIELD

The present subject matter relates to carrying devices. More particularly, the present subject matter relates to towable wheeled carrying devices.

BACKGROUND

Carrying devices, configured to accommodate loads and be carried by a person are known in the art. For example, a backpack is a carrying device in the form of a pack, or bag, carried on a person's back and secured with at least one, preferably two, straps that go over the shoulders of the person. Backpacks are often used to carry heavy loads because of their ability to distribute the load's weight on parts of the person's body that are strong, compared for example to bags carried by a person's hands that do not allow carriage of such heavy loads because of the relative weakness of the hands. However, despite of this advantage, carrying a backpack, and in particular a heavy backpack, on the back can be cumbersome and not comfortable.

Furthermore, there is a need for a device that allows carriage by a person of a load, particularly a heavy load, in rough road conditions and/or for a long distance. Such a need exists in various areas, for example, military needs, rescue, hunting, hiking, and the like.

Currently available solutions for these needs and currently available devices, for example bags, backpacks, motorized trolleys, and the like, do not provide a maximal and optimal answer to the aforementioned needs, and are not complete in terms of performance, weight and price, as a whole.

Solutions and devices for the aforementioned needs are measured according to the following criteria: weight, price, reliability, comfort of use, ergonomics (correspondence to the shape of a human body), freedom of movement, decrease of load burden from a person carrying the load, ability of carrying weight, navigability on various ground conditions, especially tough ground conditions, and the like.

Therefore, there is a need for a carrying device for carrying a load, particularly a heavy load, that provides an answer for the aforementioned challenges and demands.

SUMMARY

Unless otherwise defined, all technical and scientific terms used herein have the same meaning as commonly understood by one of ordinary skill in the art to which this subject matter belongs. Although methods and materials similar or equivalent to those described herein can be used in the practice or testing of the present subject matter, suitable methods and materials are described below. In case of conflict, the patent specification, including definitions, will control. In addition, the materials, methods, and examples are illustrative only and not intended to be limiting.

According to one aspect of the present subject matter, there is provided a carrying device comprising: a load compartment configured to accommodate a load; at least one wheel rotatably coupled to the load compartment, and configured to roll along a ground; a shaft attached to the load compartment; and a coupling element attached the shaft, wherein the coupling element is configured to couple the carrying device to a person in a manner that allows towing of the carrying device by the person.

According to one embodiment, the load compartment has a goose body-like shape—the height of the load compartment is highest substantially at the center of the load compartment, while the height of the load compartment decreases along the length of the load compartment towards both ends of the load compartment, as shown in FIG. 1.

According to another embodiment, the shaft has a goose neck-like shape—curved as shown in FIG. 1.

According to yet another embodiment, the coupling element is configured to be attached to an item worn by the person.

According to still another embodiment, the coupling element is configured to be attached to a back side of the person.

According to a further embodiment, the shaft is releasably attached to the coupling element.

According to yet a further embodiment, the shaft is configured to be attached to the coupling element at a single point.

According to still a further embodiment, the coupling element is a pivot to which the shaft is pivotally connected, in a manner that allows turning of the person in relation to a length of the shaft.

According to an additional embodiment, the shaft comprising alternating rigid and elastic areas.

According to yet an additional embodiment, the shaft comprising a bending axis configured to be in an open position when the shaft is extended and allows towing of the carrying device by a person, and a closed position when the shaft is bent and allows carrying the carrying device on a back of a person.

According to still an additional embodiment, the carrying device further comprising a carrying element configured to allow carrying of the carrying device on a person's back, wherein the carrying element is attached to a surface of the load compartment that faces upwards when the load compartment stands on the at least one wheel on a ground.

According to one embodiment, the shaft comprises at least one flexible element.

According to another embodiment, a flexible element is positioned at an end of the shaft that is configured to attach to the coupling element.

According to another aspect of the present subject matter, there is provided a system for carrying a load by a person, the system comprising: a carrying device as described herein; and a harness, configured to be worn by a person, and connect to the coupling element.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the drawings.

DESCRIPTION OF THE PREFERRED EMBODIMENTS

Figure 1:
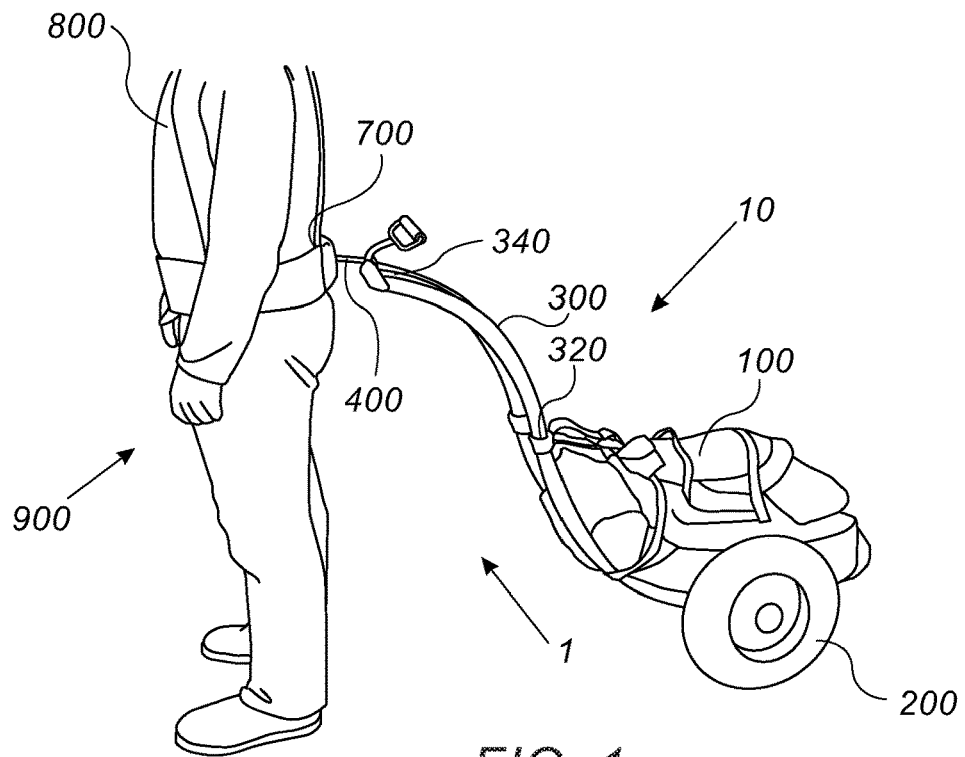
FIG. 1 schematically illustrates, according to an exemplary embodiment, a side perspective view of a carrying device harnessed to a person.

Before explaining at least one embodiment in detail, it is to be understood that the subject matter is not limited in its application to the details of construction and the arrangement of the components set forth in the following description or illustrated in the drawings. The subject matter is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

According to one aspect of the present subject matter there is provided a carrying device. According to one embodiment, the carrying device is configured to be towed by a person. According to another embodiment, the carrying device is configured to be carried by a person. Although carrying devices are known in the art, the carrying device of the present subject matter has several advantages over the prior art carrying devices, as will be disclosed hereinafter.

FIG. 1 schematically illustrates, according to an exemplary embodiment, a side perspective view of a carrying device 10 harnessed to a person 900. According to one embodiment, the carrying device 10 comprises a load compartment 100 configured to accommodate a load; at least one wheel 200 rotatably coupled to the load compartment 100 and configured to roll along a ground; a shaft 300 attached to the load compartment 100; and a coupling element 400 attached the shaft 300, wherein the coupling element 400 is configured to couple the carrying device 10 to a person 900 in a manner that allows towing of the carrying device 10 by the person 900.

According to one embodiment, the shaft 300 comprising a first end 320 configured to be attached to the load compartment 100, and a second end 340 configured to be attached to the coupling element 400.

According to one embodiment, the load compartment 100 is configured to accommodate a load of any kind, for example a load carried by soldiers, rescue personnel, hikers, campers, hunters, workers, and the like. According to some embodiments, the load compartment 100 can be configured to carry a person, for example an infant, an injured person, and the like. According to another embodiment, the load compartment 100 is similar to a backpack.

According to another embodiment, the load compartment 100 is made of any material known in the art, for example fabric, metal, rigid plastic, and the like. According to a preferred embodiment, the load compartment is made of polymeric and elastomeric materials that provide an appropriate balance between weight, elasticity and strength of the load compartment 100.

Figure 2:
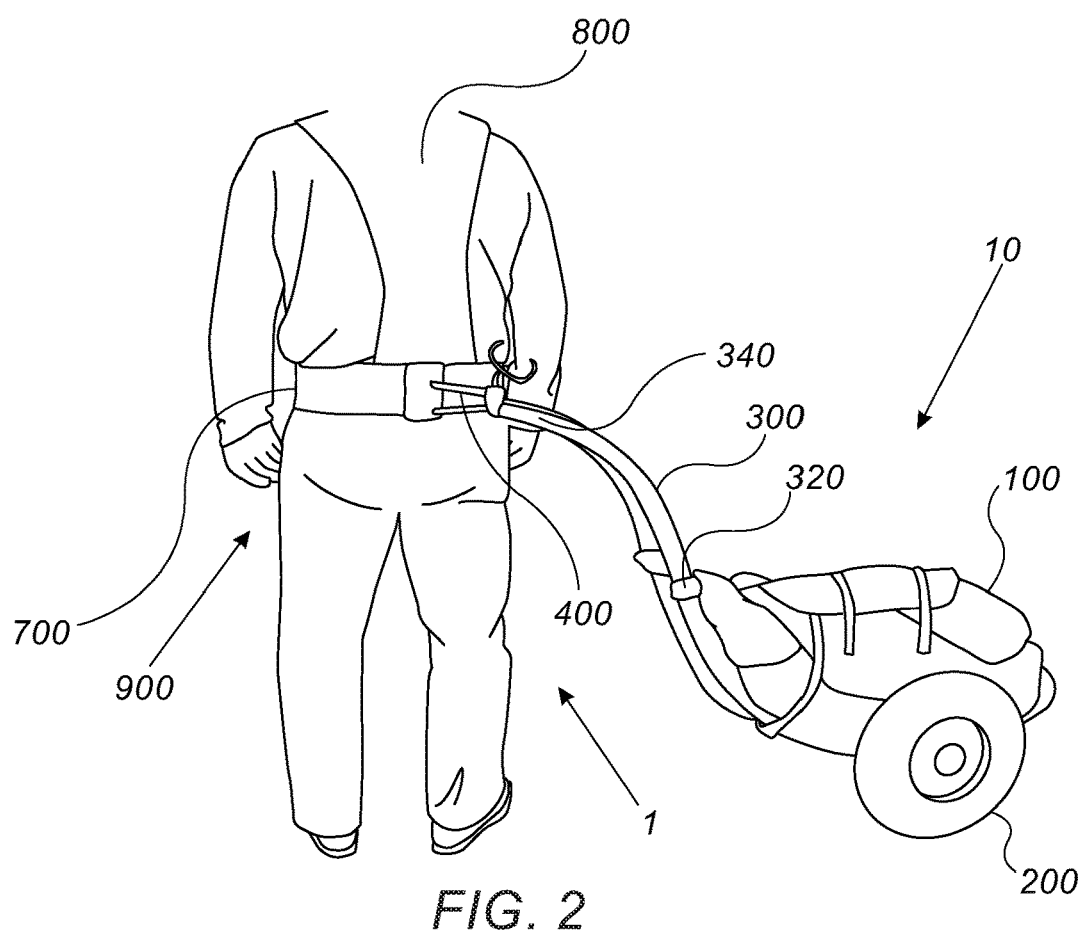
FIG. 2 schematically illustrates, according to an exemplary embodiment, a side perspective view of a carrying device harnessed to a person, while the person is turned in relation to the length of a shaft of the carrying device.

According to a preferred embodiment, the load compartment 100 has a goose body-like shape, as can be seen, for example, in FIGS. 1-2. In other words, the height of the load compartment 100 is highest substantially at the center of the load compartment 100, while the height of the load compartment 100 decreases along the length of the load compartment 100 towards both ends of the load compartment 100. This shape enables proper division of a geometric ratio between the load and the person 900 carrying the load, as well stability and operational comfort. Additional advantages of the goose body-like shape of the load compartment 100 will be described hereinafter.

According to another embodiment, at least one wheel 200 is rotatably coupled to the load compartment 100. According to a preferred embodiment, two wheels 200 are rotatably coupled to the load compartment 100. According to yet another embodiment, the at least one wheel 200 is configured to roll along any type of ground where a person 900 can walk, for example, a paved road, a dirt track, a field, a muddy land, a mountainous path, and the like. Thus, the size and dimensions of the at least one wheel 200 correspond to the type of ground on which the at least one wheel 200 is to roll along. For example, an at least one wheel 200 that is configured to roll along a muddy land is wide and comprises grooving that increase for example the adhesion of the at least one wheel 200 with the ground.

According to a further embodiment, the at least one wheel 200 is configured to act as a damping mechanism, lowering some of the load burden for the person 900 towing the carrying device 10.

According to one embodiment, the shaft 300 comprises a first end 320 attached to the load compartment 100, and a second end 340 attached to a coupling element 400 configured to couple the carrying device 10 to a person 900 in a manner that allows towing of the carrying device 10 by the person 900. Thus, according to another embodiment, the coupling element 400 is configured to be attached to an item worn by the person, for example, to a garment, like trousers, worn by the person 900, or to an accessory, like a hip belt 700, worn by a person 900. According to a preferred embodiment, the coupling element 400 is configured to be attached to a back side of the person 900, thus allowing towing of the carrying device 10 during walking of the person 900. According to another embodiment, the second end 340 of the shaft 300 is releasably attached to the coupling element 400. Thus, when desired, the second end 340 of the shaft 300 can be disconnected from the coupling element 400, thus releasing the carrying device 10 from a person 900. According to yet another embodiment, the second end 340 of the shaft 300 is permanently attached to the coupling element 400.

According to a further embodiment, the second end 340 of the shaft 300 is configured to be attached to the coupling element 400 at a single point, thus enabling a high mobility of the person 900 towing the carrying device 10, while keeping the hands of the person 900 free.

According to one embodiment, the coupling element 400 is a pivot to which the second end 340 of the shaft 300 is pivotally connected. The pivot is attached, for example, to a garment or a hip belt 700 worn by a person 900. Thus, according to this embodiment, when the carrying device 10 is towed by a person 900, the coupling element 400 allows turning of the person 900 in relation to a length of the shaft 300.

FIG. 2 schematically illustrates, according to an exemplary embodiment, a side perspective view of a carrying device 10 harnessed to a person 900, while the person 900 is turned in relation to the length of a shaft 300 of the carrying device 10. FIG. 2 shows how a person 900 can turn in relation to the length of shaft 300 due to the pivotal connection between the second end 340 of the shaft 300 and the coupling element 400.

According to a further embodiment, the shaft 300 is straight (not shown). According to yet a further embodiment, the shaft 300 is curved. According to a preferred embodiment, the shaft 300 has a goose neck-like shape—curved as can be seen, for example, in FIGS. 1-2.

According to one embodiment, the load compartment 100 has a shape resembling a shape of a body of a goose, and the shaft 300 has a prior art shape, for example the shaft is straight. According to another embodiment, the load compartment 100 has a prior art shape, for example a contour comprising straight lines, and the shaft 300 has a shape resembling a goose neck. According to yet another embodiment, the load compartment 100 has a shape resembling a shape of a body of a goose, and the shaft 300 has a shape resembling a goose neck, as can be seen, for example, in FIGS. 1-2.

Figure 3:
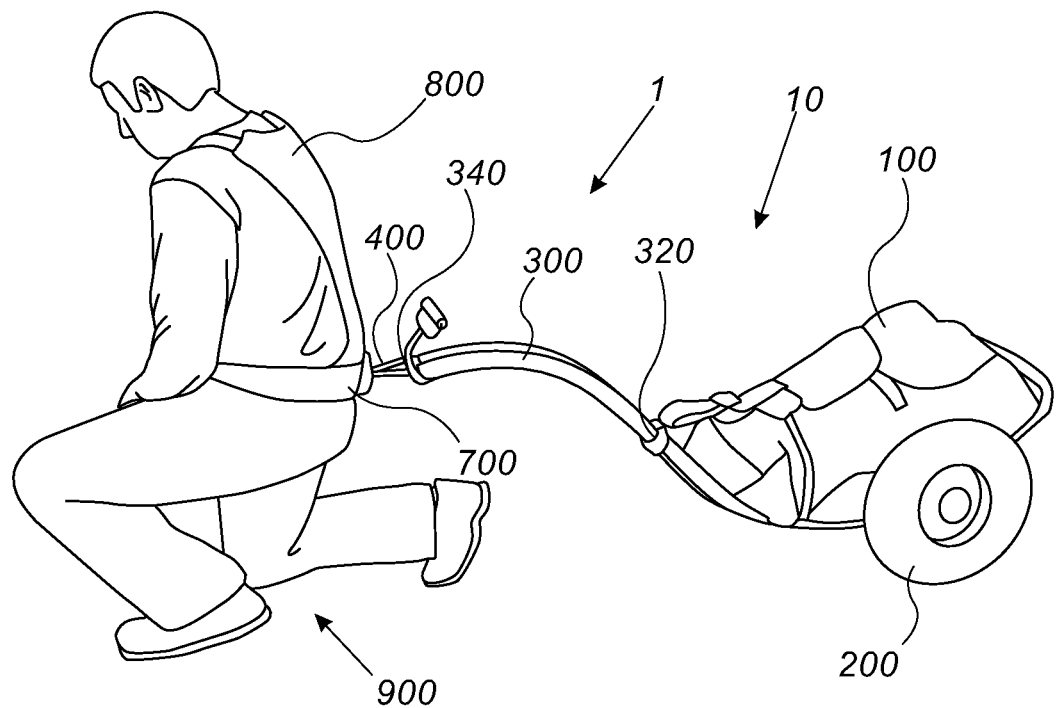
FIG. 3 schematically illustrates, according to an exemplary embodiment, a side perspective view of a carrying device harnessed to a person, while the person is in a kneeling position.

FIG. 3 schematically illustrates, according to an exemplary embodiment, a side perspective view of a carrying device 10 harnessed to a person 900, while the person 900 is in a kneeling position.

Figure 4:
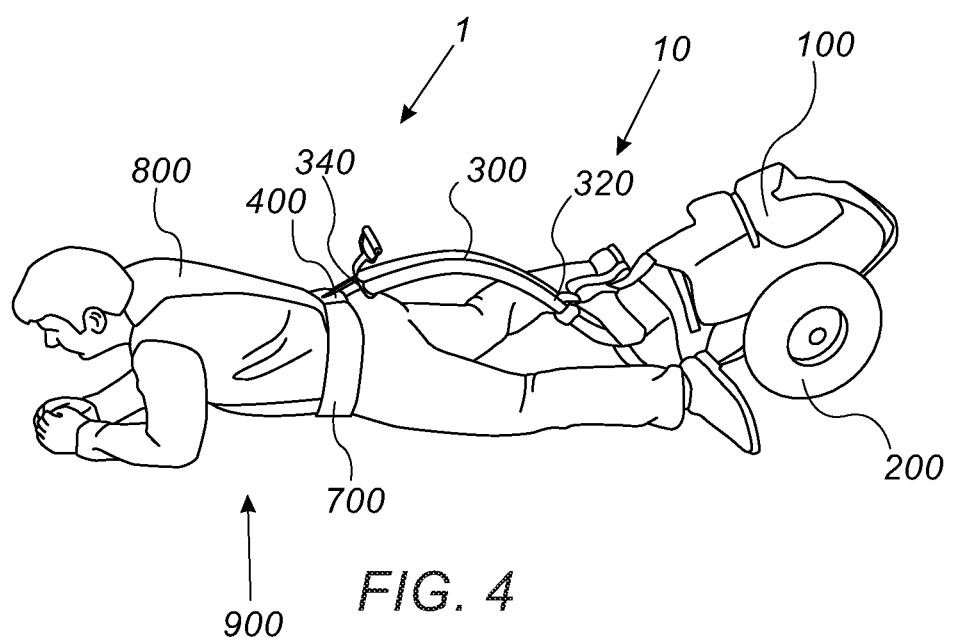
FIG. 4 schematically illustrates, according to an exemplary embodiment, a side perspective view of a carrying device harnessed to a person, while the person is in a lying down, or crawling, position.

FIG. 4 schematically illustrates, according to an exemplary embodiment, a side perspective view of a carrying device 10 harnessed to a person 900, while the person 900 is in a lying down, or crawling, position.

One advantage of the curved shaft 300, and particularly of the goose neck-shaped shaft 300, of the load compartment 100 having a shape resembling the shape of a body of a goose, and of a combination thereof, is that it allows the person 900 to kneel and even lie down or crawl when the carrying device 10 is attached to the person's 900 back. Thus, the curved shaft 300, more particularly the shaft 300 having a shape similar to the shape of a goose neck, the goose body-like load compartment 100, and the combination thereof, is advantageous over prior art shapes of the load compartment 100 and the shaft 300—for example, a straight shaft 300, a load compartment 100 having another shape, for example a shape comprising straight lines contours, and a combination thereof, because kneeling or lying down or crawling when a carrying device 10 having a prior art shape is attached to the back of the person 900, would not be possible because the load compartment 100 would hit the ground during the descending of the person 900 to a kneeling or lying/crawling position. On the other hand, the curved shape, particularly the goose neck-like shape, of the shaft 300, the shape of the load compartment 100 resembling a shape of a body of a goose, and a combination thereof, allow descending of the person 900 to a kneeling or lying/crawling position, without the load compartment 100 hitting the ground.

According to one embodiment, the shaft 300 comprising alternating rigid and elastic areas. According to another embodiment, the rigid areas of the shaft 300 are made of any rigid material known in the art, for example metal, rigid plastic polymer, and the like. According to yet another embodiment, the elastic parts of the shaft 300 are made of any elastic material known in the art, for example fabric, elastic plastic polymer, and the like.

According to a further embodiment, the sizes of the rigid areas and the elastic areas of the shaft 300, as well as the level of rigidity of the rigid areas and the level of elasticity of the elastic areas of the shaft 300, are configured to prevent undesirable fluctuation of the shaft 300 during movement, as well as to transfer forces between the person 900 and the load compartment 100 in a damping manner.

According to some embodiments, the carrying device 10 is configured to be carried by a person 900 on his back, like a backpack. Therefore, the shaft 300 is configured to be bent in order to facilitate the carriage of the carrying device 10 on a person's 900 back. Thus, according to one embodiment, the shaft comprises a bending axis 350 as shown in FIGS. 5-7.

Figure 5:
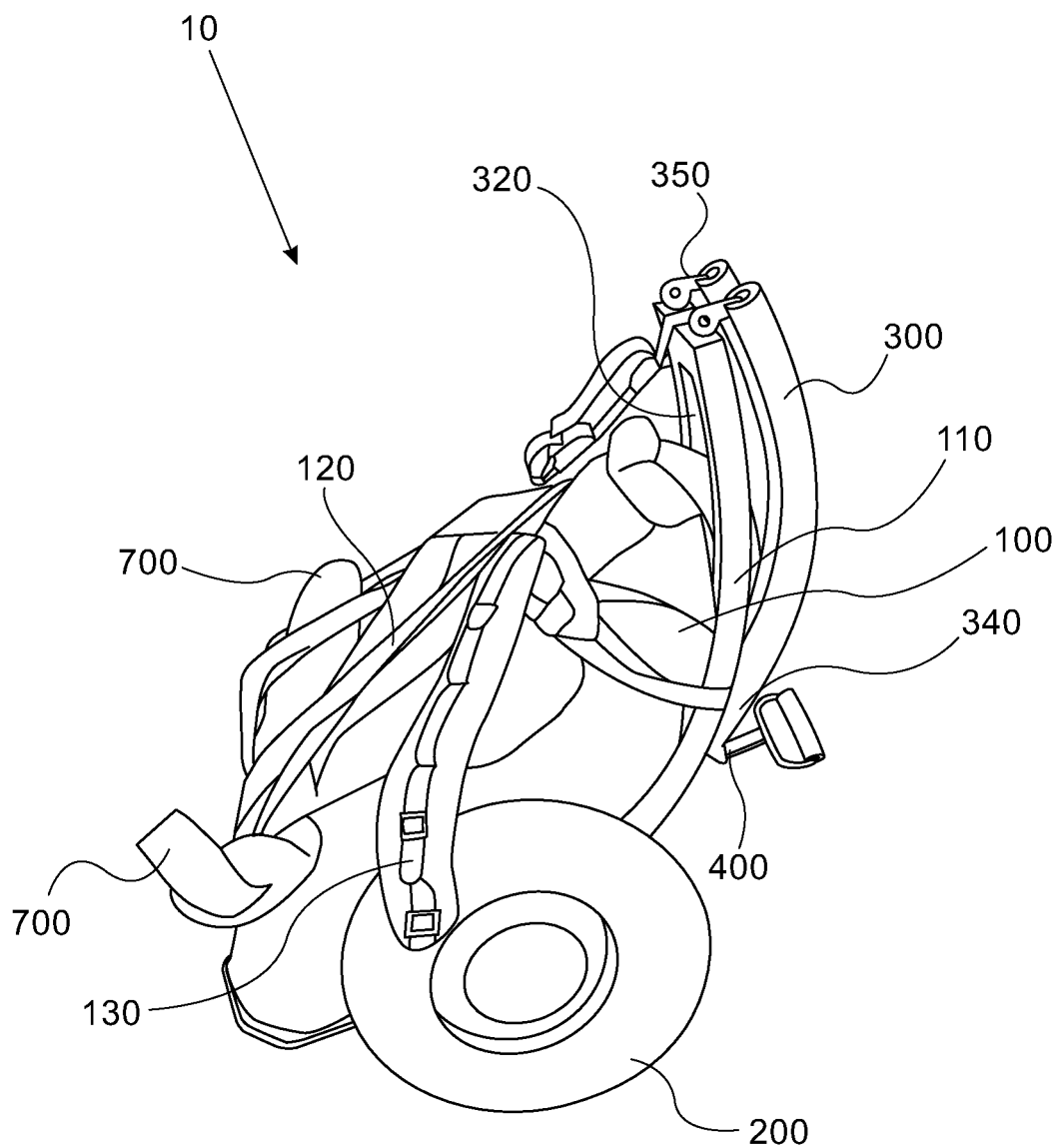
FIG. 5 schematically illustrates, according to an exemplary embodiment, a side perspective view of a carrying device, with a bent shaft.

FIG. 5 schematically illustrates, according to an exemplary embodiment, a side perspective view of a carrying device 10, with a bent shaft 300.

Figure 6:
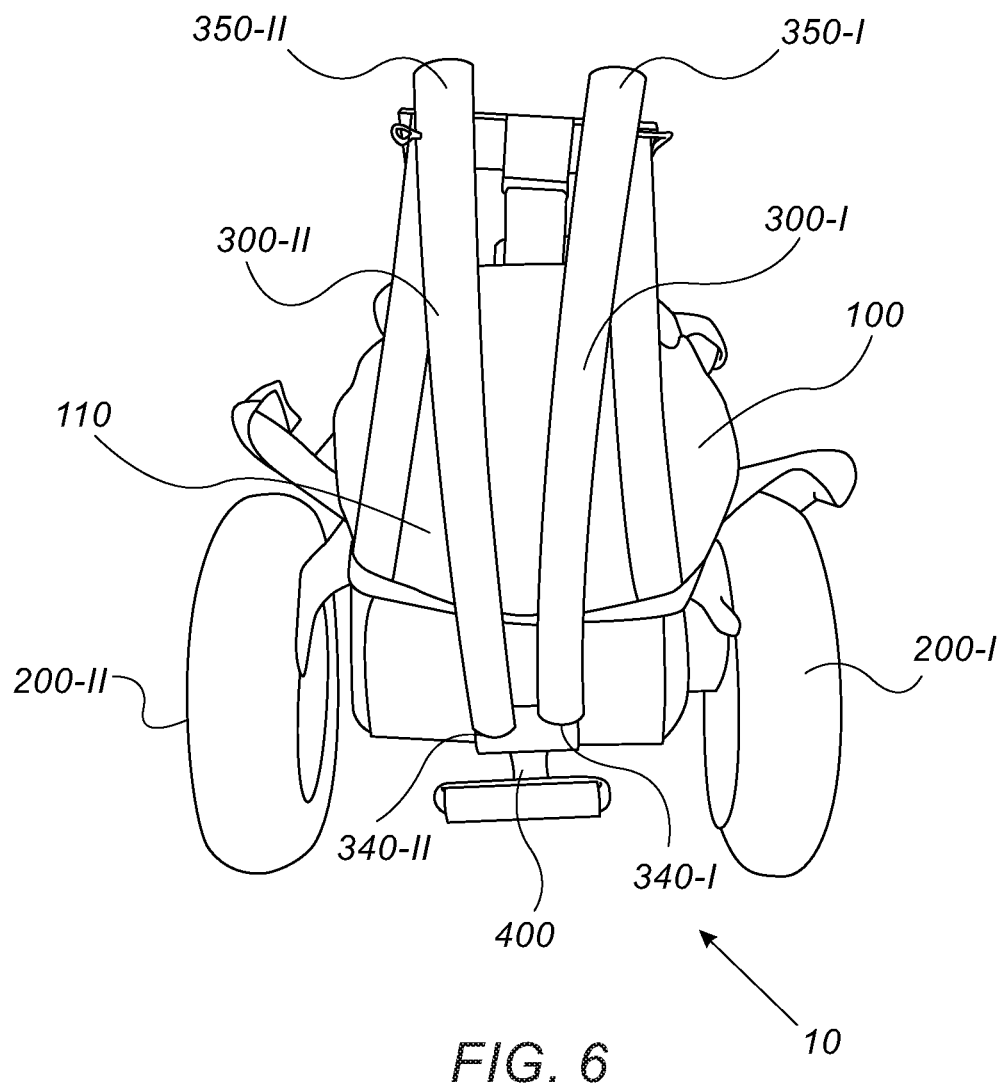
FIG. 6 schematically illustrates, according to an exemplary embodiment, a back perspective view of a carrying device, with a bent shaft.

FIG. 6 illustrates, according to an exemplary embodiment, a back perspective view of a carrying device 10, with a bent shaft 300.

Figure 7:
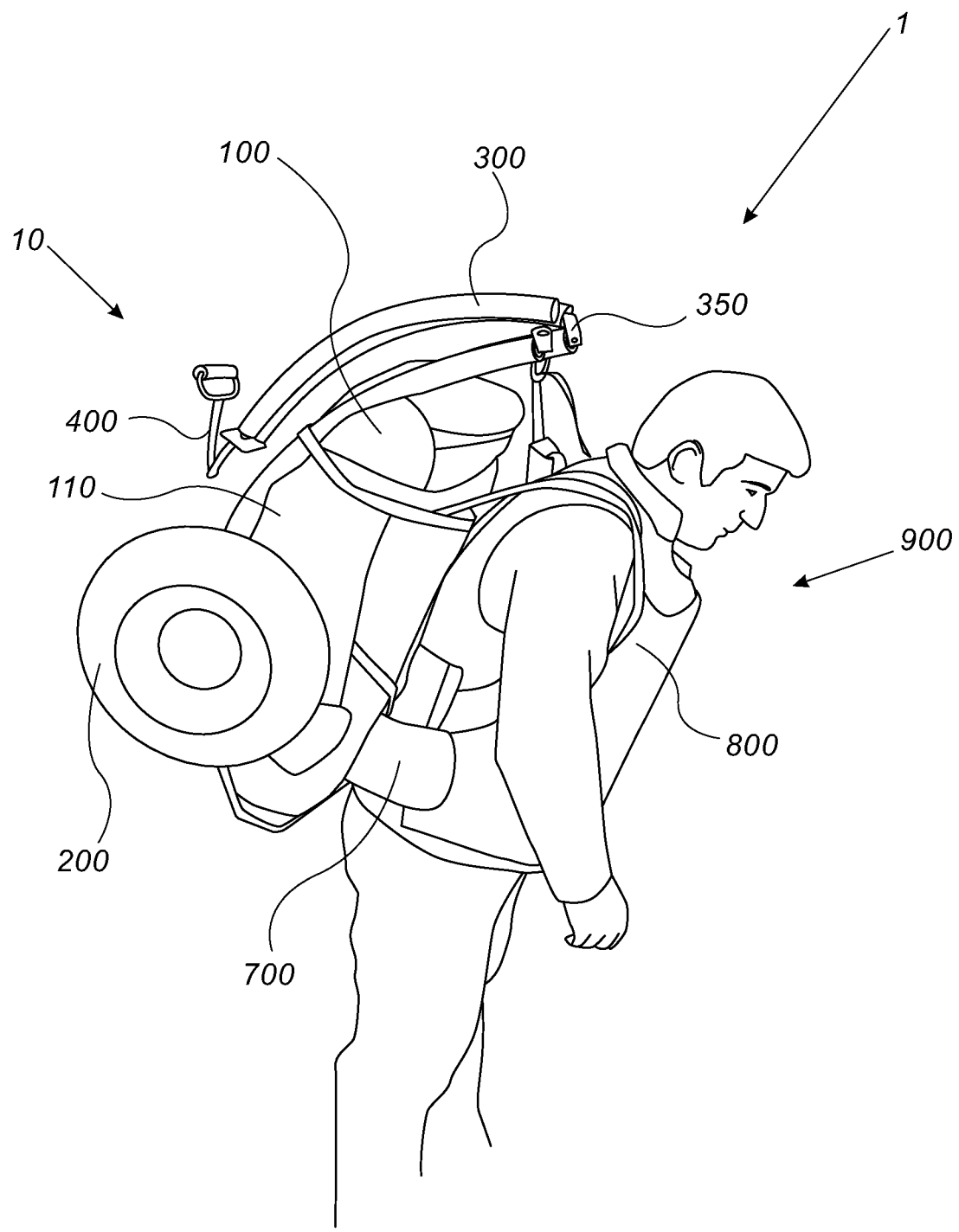
FIG. 7 schematically illustrates, according to an exemplary embodiment, a side perspective view of a carrying device, with a bent shaft, carried on a back of a person.

FIG. 7 illustrates, according to an exemplary embodiment, a side perspective view of a carrying device 10, with a bent shaft 300, carried on a back of a person 900.

According to one embodiment, the shaft 300 further comprises a bending axis 350, configured to be in two positions—an open position when the shaft 300 is extended and allows towing of the carrying device 10 by a person 900, as shown in FIGS. 1-4; and a closed position when the shaft 300 is bent and allows carrying the carrying device 10 on a back of a person 900, as shown in FIGS. 5-7.

According to a further embodiment, the bending axis 350 of the shaft 300 is positioned in the vicinity of the first end 320 of the shaft, adjacent to the load compartment 100. According to yet a further embodiment, the bending axis 350 allows bending of the shaft 350 towards a lower surface 110 of the load compartment 100, namely, the surface of the load compartment 100 that faces the ground when the load compartment 100 stands on the ground.

According to an additional embodiment, the carrying device 10 further comprising a carrying element configured to allow carrying of the carrying device 10 on a person's 900 back, wherein the carrying element is attached to an upper surface 120 of the load compartment 100, namely, the surface of the load compartment 100 that faces upwards when the load compartment 100 stands on the at least one wheel 200 on a ground. When the carrying device 10 is carried by a person 900, the upper surface 120 of the load compartment 100 faces the back of the person.

According to one embodiment, the carrying element can be at least one strap 130, configured to be used similarly to a strap of a backpack. According to another embodiment, the carrying element can be a hip belt 700, configured to be used similarly to a hip belt of a backpack. According to yet another embodiment, the carrying element comprises any element known in the art for carrying the carrying device 10 on a person's 900 back, and combinations thereof.

The present subject matter further provides a system for carrying a load by a person 1. For the sake of simplicity only, the system for carrying a load by a person 1 will be occasionally referred to as the "system 1". According to one embodiment, the system 1 comprises a carrying device 10, including all its embodiments, as described above, and a harness 800 configured to be worn by a person and connect to the coupling element 400. According to another embodiment, the harness 800 is wearable over a person's 900 torso, namely over the chest, abdomen and back of a person 900. According to yet another embodiment, the harness 800 is configured to distribute the weight of the carrying device 10 over a large area of the person's 900 body, thus decreasing the load burden on the person 900 while towing the carrying device 10 or carrying the carrying device 10 on his back. This can be achieved, for example, by connecting the coupling element 400 to the harness 800, preferably to a back side of the harness 800, connecting the at least one strap 130 to the harness 800, connecting the hip belt 700 to the harness 800, and any combination thereof.

According to the embodiment shown in FIG. 6, the carrying device 10 comprises at least one shaft 300, for example a first shaft 300-I and a second shaft 300-II. Furthermore, according to the embodiment shown in FIG. 6, the carrying device 10 comprises two wheels—a first wheel 200-I and a second wheel 200-II, at opposite sides of the load compartment 100. Thus, according to one embodiment, a first end 320-I of the first shaft 300-I is adjacent to the first wheel 200-I, and the first end 320-II of the second shaft 300-II is adjacent to the second wheel 200-II. According to another embodiment, the first shaft 300-I and the second shaft 300-II are bent in such a manner that the second end 340-I of the first shaft 300-I and the second end 340-II of the second shaft 300-II meet at a single coupling element 400. According to an additional embodiment, the first shaft 300-I comprises a bending axis 350-I, and the second shaft 300-II comprises a bending axis 350-II. The bending axis 350-I of the first shaft 300-I and the bending axis 350-II if the second shaft 300-II are positioned adjacent to an edge of the load compartment 100. As a result, a part of the first shaft 300-I and a part of the second shaft 300-II—between the wheels 200-I and 200-II and the bending axes 350-I and 350-II, are positioned along the first surface 110 of the load compartment 100; and a part of the first shaft 300-I as well as a part of the second shaft 300-II—between the bending axes 350-I and 350-II and the second ends 340-I and 340-II, extend beyond the load compartment 100 and connect the load compartment with the coupling element 400.

In addition to the aforementioned embodiments, the carrying device 10 of the present subject matter is configured to solve the problem of disharmony between vibrations generated by a person 900 to which the carrying device 10 is harnessed and vibrations generated by the carrying device 10 during towing of the carrying device 10 by the person 900. While moving, a person 900 generates vibrations at a certain frequency, which is affected by the dimensions of the person 900 and the type of movement of the person 900. For example, the frequency of vibrations of the person 900 generated during walking is different from the frequency of vibrations of the person 900 generated during running. On the other hand, the carrying device 10 generates vibrations in a different frequency, which is affected by the dimensions of the carrying device 10, the fact that the carrying device moves on wheels, and the type of surface on which the carrying device 10 is towed. In most of the cases, the frequency of vibrations of the person 900 is different from the frequency of vibrations of the carrying device 10 during movement. This disharmony, or lack of synchronization, between the vibration frequency of the person 900 and vibration frequency of the carrying device 10 is translated to pushing and pulling forces sensed by the person 900 during towing of the carrying device 10. These pushing and pulling forces sensed by the person 900 can turn the activity of towing the carrying device 10 to an unpleasant and even intolerable experience. The carrying device 10 of the present subject matter solves this problem of disharmony in vibration frequencies between the person 900 and the carrying device 10 by comprising at least one flexible element 360 at the shaft 300.

Figure 8A:
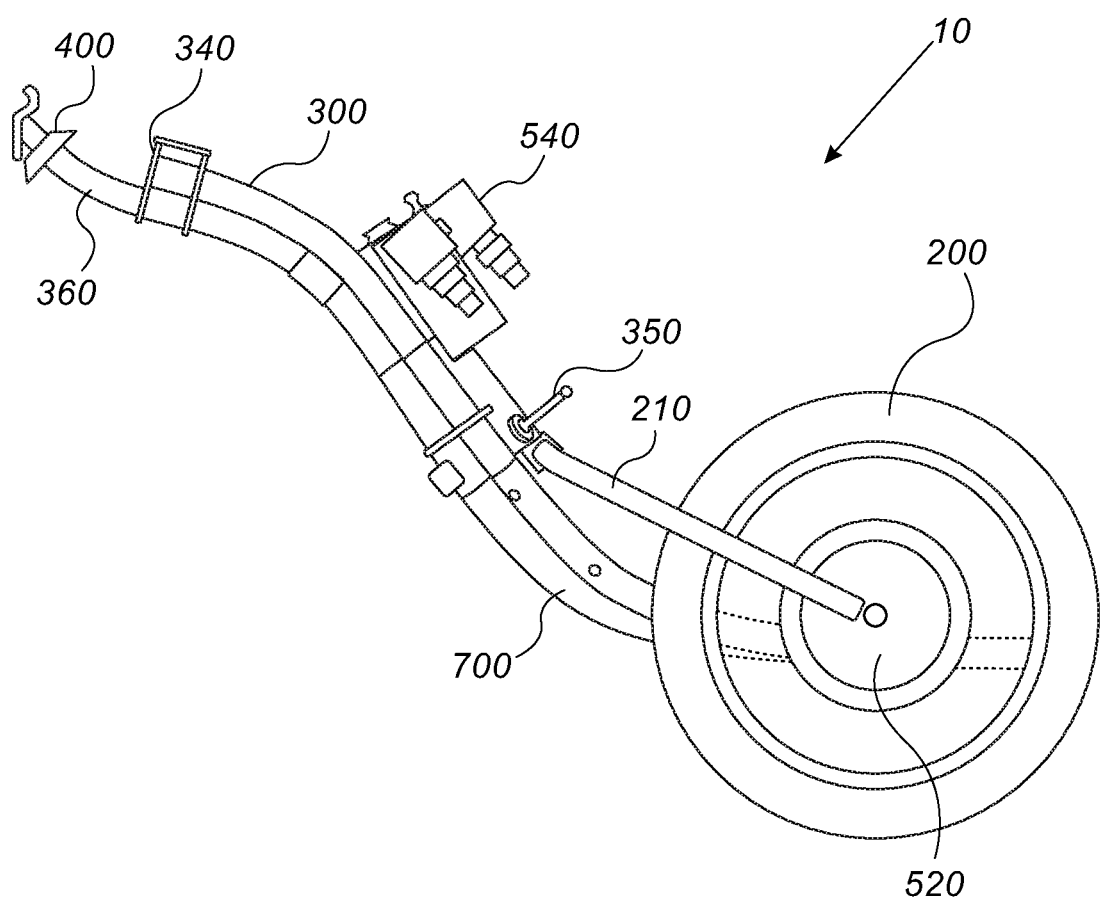
FIGS. 8A-B schematically illustrate, according to an exemplary embodiment, a side view and a back perspective view, respectively, of a carrying device comprising at least one flexible element at the shaft.
Figure 8B:
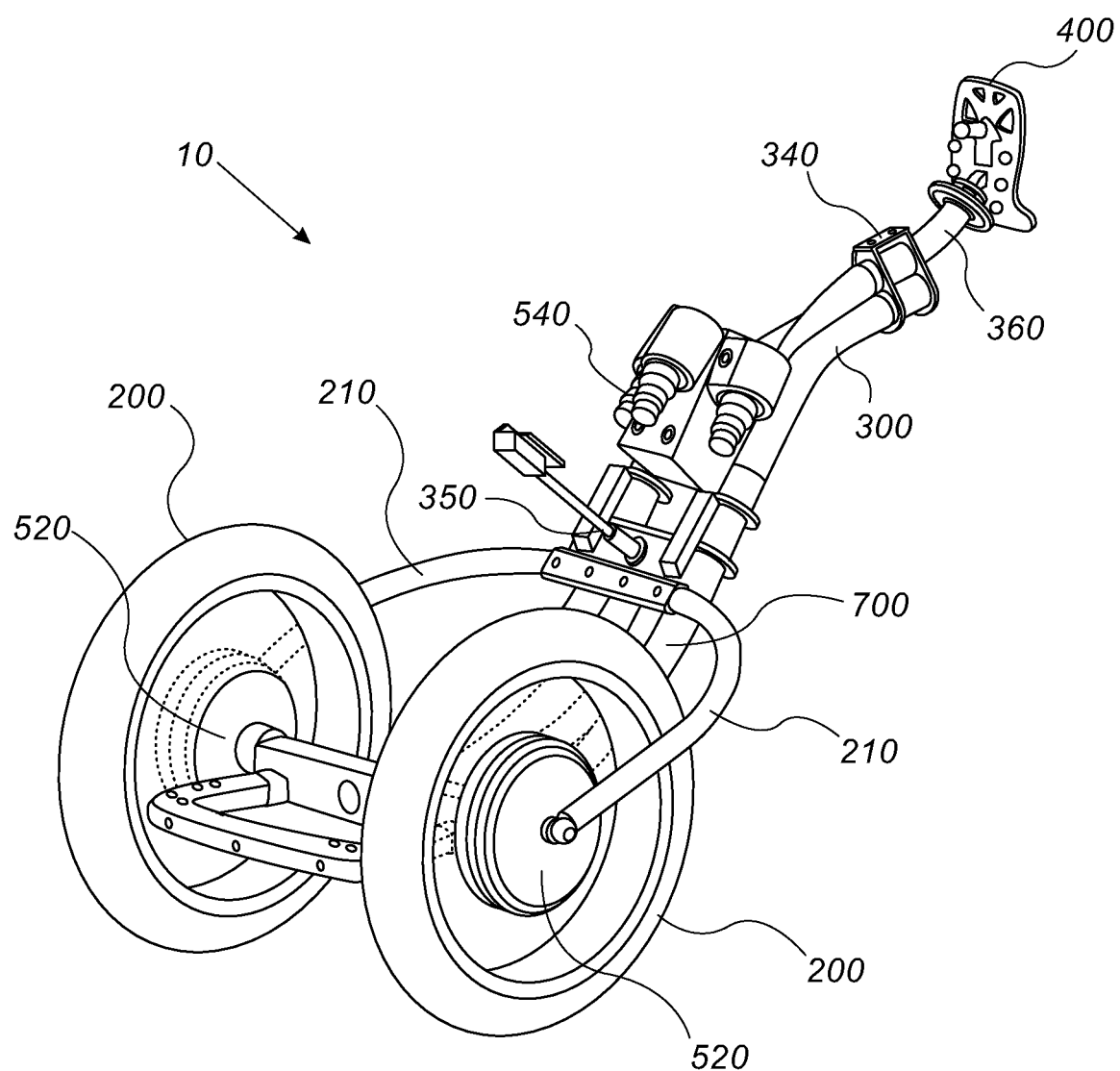

FIGS. 8A-B schematically illustrate, according to an exemplary embodiment, a side view and a back perspective view, respectively, of a carrying device 10 comprising at least one flexible element 360 at the shaft 300. According to one embodiment, a flexible element 360 is positioned anywhere along the shaft 300. According to a preferred embodiment, the flexible element 360 is positioned at the second end 340 of the shaft 300, as can be seen in FIGS. 8A-B. In other words, the flexible element is positioned at an end of the shaft 300 that is configured to attach to the coupling element 400. According to one embodiment, the flexible element 360 is a part of the shaft 300 adjacent to the second end 340 of the shaft 300. In other words, the part of the shaft 300 adjacent to the second end 340 is flexible and considered as a flexible element 360. According to another embodiment, the flexible element 360 is connected between the second end 340 of the shaft 300 and the coupling element 400. The flexible element 360 is configured to restrain the aforementioned pushing and pulling forces sensed by the person 900 while towing the carrying device 10. Furthermore, the combination of the flexible element 360 and the shape and elasticity of the carrying device 10 as described herein, restrain the pushing and pulling forces sensed by the person 900.

According to one embodiment, the flexible element 360 is made of any flexible, or elastic, material known in the art. For example, the flexible element 360 can be made of a flexible polymer, or a mix of more than one flexible polymers, for example plastic, rubber and the like. According to another embodiment, the flexible element 360 can be a system made of a combination of rigid parts interconnected by flexible parts like springs, pistons, bearings and the like. According to a preferred embodiment, the flexible element 360 is made of cast polyurethane having a combination of strength and flexibility that together give rise to the desired outcome of strength of flexible element 360 and the restraining of the pushing and pulling forces sensed by the person 900.

Figure 9:
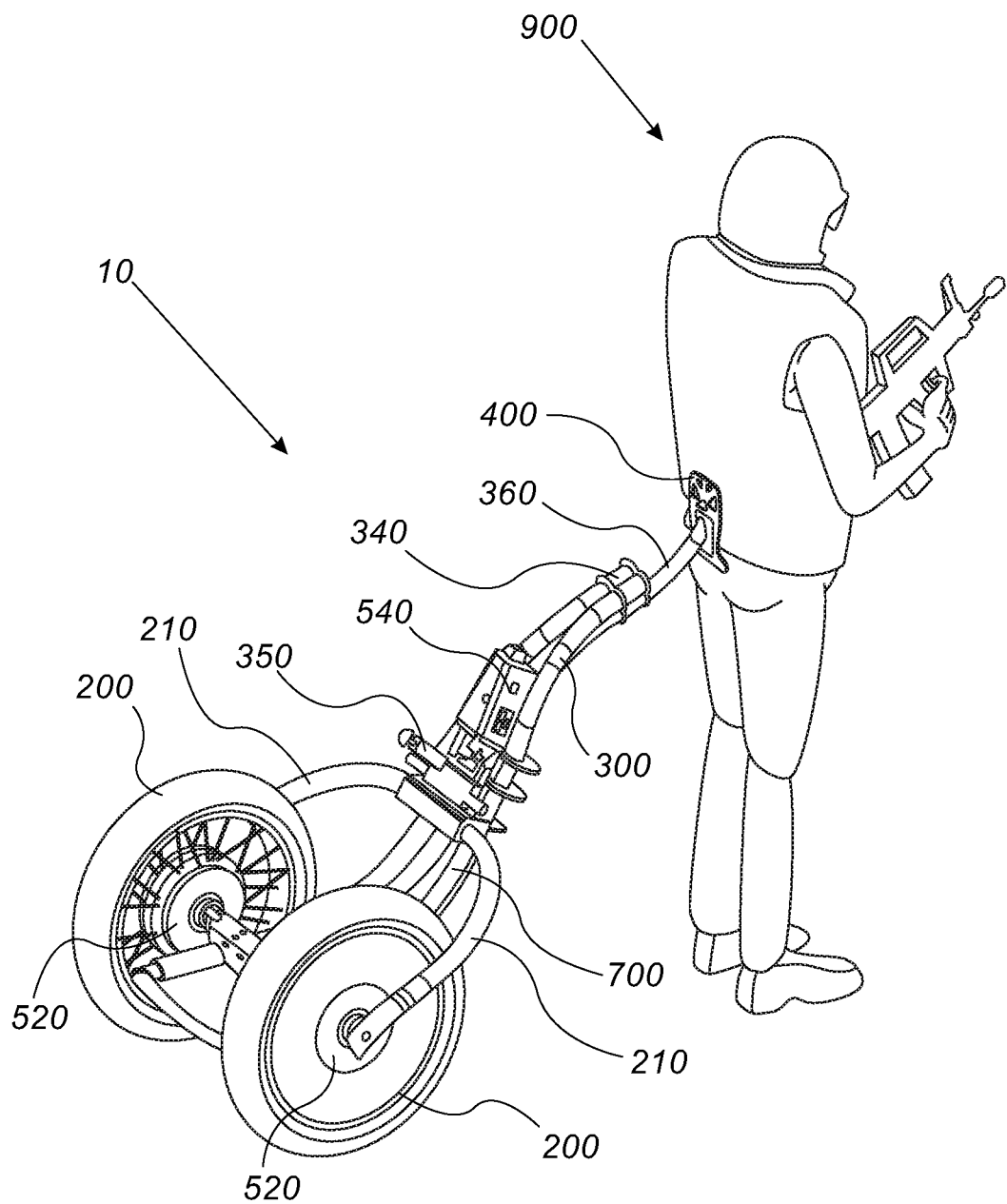
FIG. 9 schematically illustrates, according to an exemplary embodiment, a back perspective view of a carrying device comprising at least one flexible element harnessed to a person.

FIG. 9 schematically illustrates, according to an exemplary embodiment, a back perspective view of a carrying device 10 comprising at least one flexible element 360 harnessed to a person 900.

In addition to the aforementioned embodiments, the flexible element 360 contributes to the matching between the dimensions of the person 900 and the dimensions of the carrying device 10, together with the type of the surface on which the person 900 walks, the orientation of the person 900—standing, kneeling or lying down, or crawling, and the speed of movement of the person 900. The addition of the flexible element 360 as described herein, per se or in combination with the shape and elasticity of the carrying device 10, lower or minimize, or even neutralize the burden put on the person 900 during towing of the carrying device.

Figure 10:
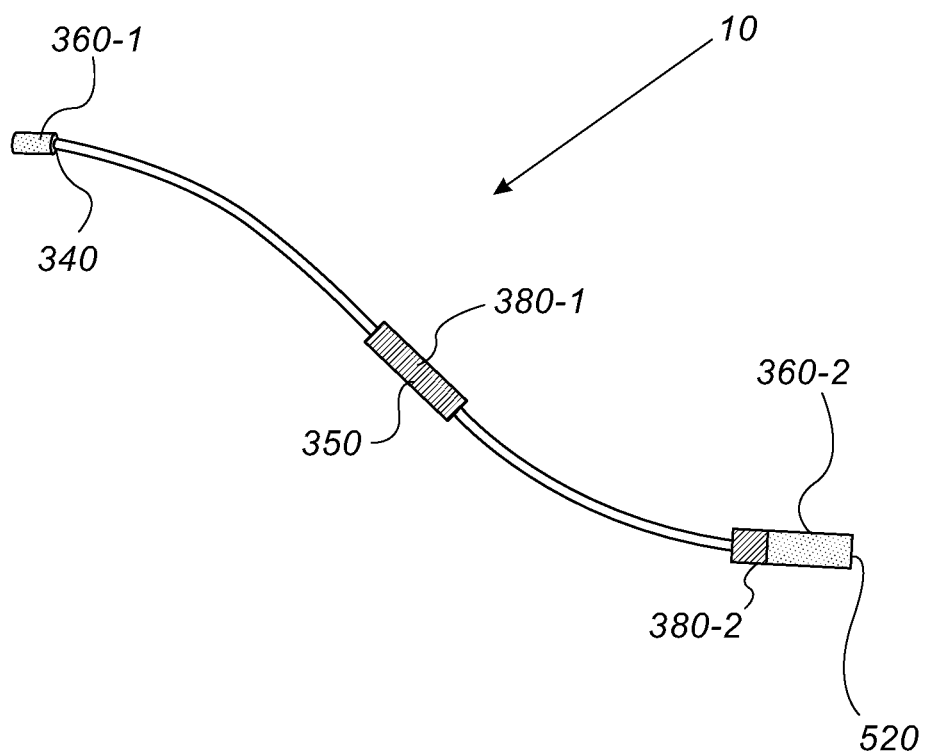
FIGS. 10-11 schematically illustrate a side view and a top view, respectively, of an additional exemplary embodiment of a carrying device 10 in relation to the flexibility and rigidity of the shaft 300.
Figure 11:
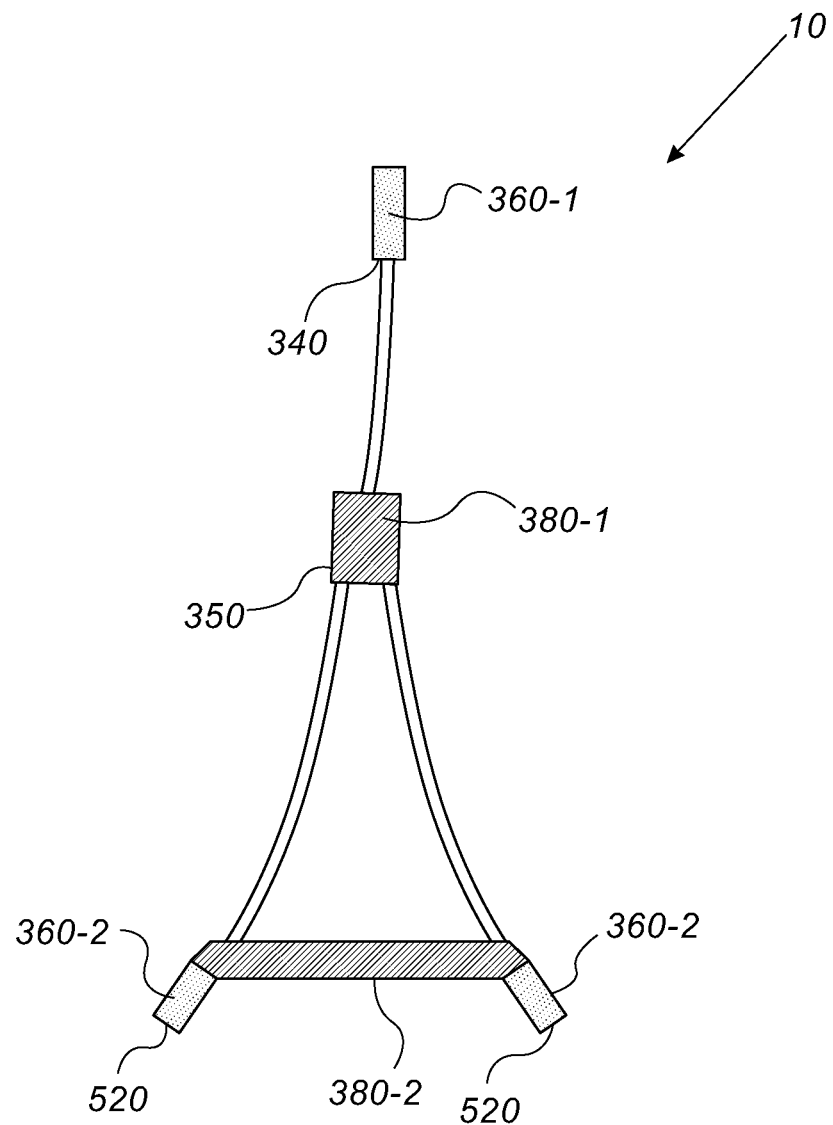

FIGS. 10-11 schematically illustrate a side view and a top view, respectively, of an additional exemplary embodiment of a carrying device 10 in relation to the flexibility and rigidity of the shaft 300.

According to the embodiment illustrated in FIGS. 8A-B and 9, the shaft comprises a flexible element 360, for example at the second end 340 of the shaft 300, adjacent to coupling element 400, the various embodiments of which are described in detail with reference to FIGS. 8A-B and 9. According to some other embodiments, the shaft 300 comprises at least one flexible element 360, as can be seen for example in FIGS. 10-11. The structure of the carrying device 10 illustrated in FIGS. 10-11 is similar to the structure of the carrying device 10 illustrated in FIGS. 8-A-B and 9.

According to one embodiment, there can be a first flexible element 360-1 adjacent to the second end 340 of the shaft 300, according to the embodiments described in reference to FIGS. 8A-B and 9, and a second flexible element 360-2 adjacent to at least one of the wheels 200 of the carrying device 10. It should be noted that the scope of the present subject matter is not limited to only a first flexible element 360-1 and a second flexible element 360-2 as described above in relation to the number of the flexible elements 360 and their position. Any number of flexible elements 360 placed anywhere at the shaft 300 in particular and the carrying device 10 in general, is under the scope of the present subject matter. It should be further noted that the embodiments and advantages described above in relation to the flexible element 360 are relevant to each one of the at least one flexible element 360 of the shaft 300.

According to one embodiment, the shaft 300 comprises at least one rigid element 380. The at least one rigid element 380 can be positioned in places where rigidity is desired. For example, as can be seen in FIGS. 10-11, the shaft 300 comprises a first rigid element 380-1 at the bending axis 350 area (compare FIG. 10B with FIG. 9). For another example, a second rigid element 380-2 can be at the axis area of the wheels 200, in order to provide strength to this area. It should be noted that the scope of the present subject matter is not limited to only a first rigid element 380-1 and a second rigid element 380-2 as described above in relation to the number of the rigid elements 380 and their position. Any number of rigid elements 380 placed anywhere at the shaft 300 in particular and the carrying device 10 in general, is under the scope of the present subject matter.

According to one embodiment, the shaft 300 comprises at least one flexible element 360 and at least one rigid element 380, according to embodiments described above. A combination of flexible elements 360 and rigid elements 380 can further contribute to the comfortability of using the carrying device 10 of the present subject matter. This is because the at least one rigid element 380 confers strength and rigidity to places where strange and rigidity are needed, for example at an axis of the wheels. On the other hand, the at least one flexible element 360 can absorb forces exerted on parts of the carrying device 10 that otherwise can pose a burden on a user of the carrying device 10. The at least one flexible element 360 can also change its shape according to forces exerted on the carrying device 10, further contributing to the absorbance of forces exerted on the carrying device 10 and by that contributing to the comfortability of the user.

The absorbance of forces and damping by the at least one flexible element 360, or by the at least one rigid element 380, or by the at least one flexible element 360 and at least one rigid element 380, can be accomplished by at least one of several exemplary embodiments, or a combination thereof, as follows: number of the flexible/rigid elements, size of the flexible/rigid elements, degree of flexibility/rigidity of the flexible/rigid elements, place of the flexible/rigid elements in the carrying device, and relative geometry of the flexible/rigid elements.

The usage of at least one flexible element 360, or at least one rigid element 380, or both at least one flexible element 360 and at least one rigid element 380, is advantageous over other mechanisms for absorbing forces exerted on the carrying device 10 and improving the comfortability of the user, which include, for example, complex mechanisms of pistons, springs, bearings and the like. The advantage of the flexible/rigid elements can be considered in terms of simplicity of manufacturing, durability, less weight, lower price and avoidance of noise. Movement of mechanical elements like pistons and bearing can produce noise, while flexible/rigid elements do not, because the flexible/rigid elements can be manufactured simply by changing the type of material of which a certain component is made. This issue, of noise avoidance, can be critical, for example, in military uses, when a soldier for example carries a load with the carrying device 10 of the present subject matter, and does not wish to be detected by the enemy.

According to one embodiment, the carrying device 10 can be motorized in order to further decrease the burden from the person 900 towing the carrying device 10. According to this embodiment, as can be seen for example in FIGS. 8A-B, the carrying device 10 comprises at least one motor 520 configured to set at least one wheel 200 in motion. According to one embodiment, a motor 520 is attached to a wheel 200 of the carrying device 10. According to another embodiment, a motor 520 is attached to each wheel 200 of the carrying device 10. Even though the motor 520 illustrated in FIGS. 8A-B is shown attached to the wheel 200, this should not be considered at limiting the scope of the present subject matter. The motor 250 can be placed anywhere on the carrying device 10 and set at least one wheel 200 in motion by any mechanism known in the art, for example with chains, or a turning shaft transferring mechanical energy from the motor 520 to the at least one wheel 200, and the like.

Any type of motor 520 is under the scope of the present subject matter, for example diesel motor, gas motor, gasoline motor, electrical motor and the like. According to a preferred embodiment, the motor 520 is an electrical motor. Even though it is not illustrated in the FIGS. of the present application, it should be understood that the carrying device 10 comprises a power source necessary for the function of the motor 520. For example, in an embodiment of a gasoline motor, the carrying device 10 comprises a gasoline tank, and in an embodiment of an electrical motor, the carrying device 10 comprises an electrical power source, for example a battery chemically storing electric energy, a photoelectric cell configured to transform light energy to electrical energy, an electric generator configured to transform mechanical energy—for example mechanical energy of the rotation of a wheel 200, to electrical energy, and the like.

According to one embodiment, the carrying device 10 comprises a motor control unit 540 configured to control the function of the motor 520. Any type of motor control unit 520 known in the art, functioning in any mechanism known in the art, is under the scope of the present subject matter. For example, the motor control unit 540 is configured to control the speed of motion of the motor 520. The motor control unit 540 can be positioned anywhere on the carrying device 10, and connected to the motor 520 by any mechanism known in the art, for example with wires, or wirelessly, and the like. According to some embodiments, a component, or at least part, of the motor control unit 540, can be held by the person 900, or carried by the person 900, for example by attaching the control unit 540, or part of the control unit 540, to a garment worn by the person 900. According to some other embodiments, the motor control unit 540 can respond to any type of command known in the art, for example voice command, physical touch command like pushing buttons, gesture command for example by moving a hand of the user 900 in a certain way, and the like.

Figure 12:
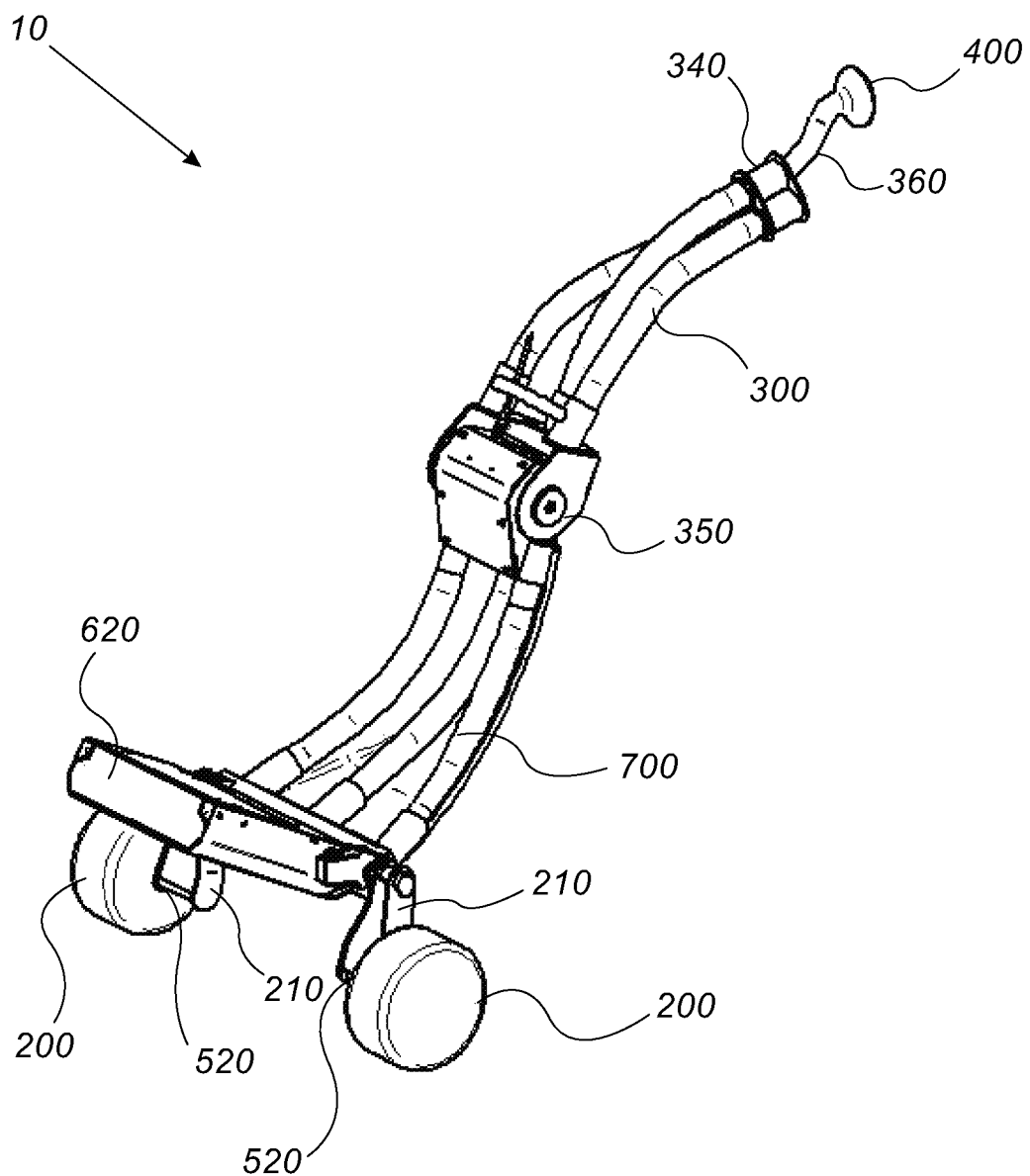
FIG. 12 schematically illustrates, according to an exemplary embodiment, a back perspective view of a carrying device comprising two wheels and a power source.

FIG. 12 schematically illustrates, according to an exemplary embodiment, a back perspective view of a carrying device comprising two wheels and a power source.

Figure 13:
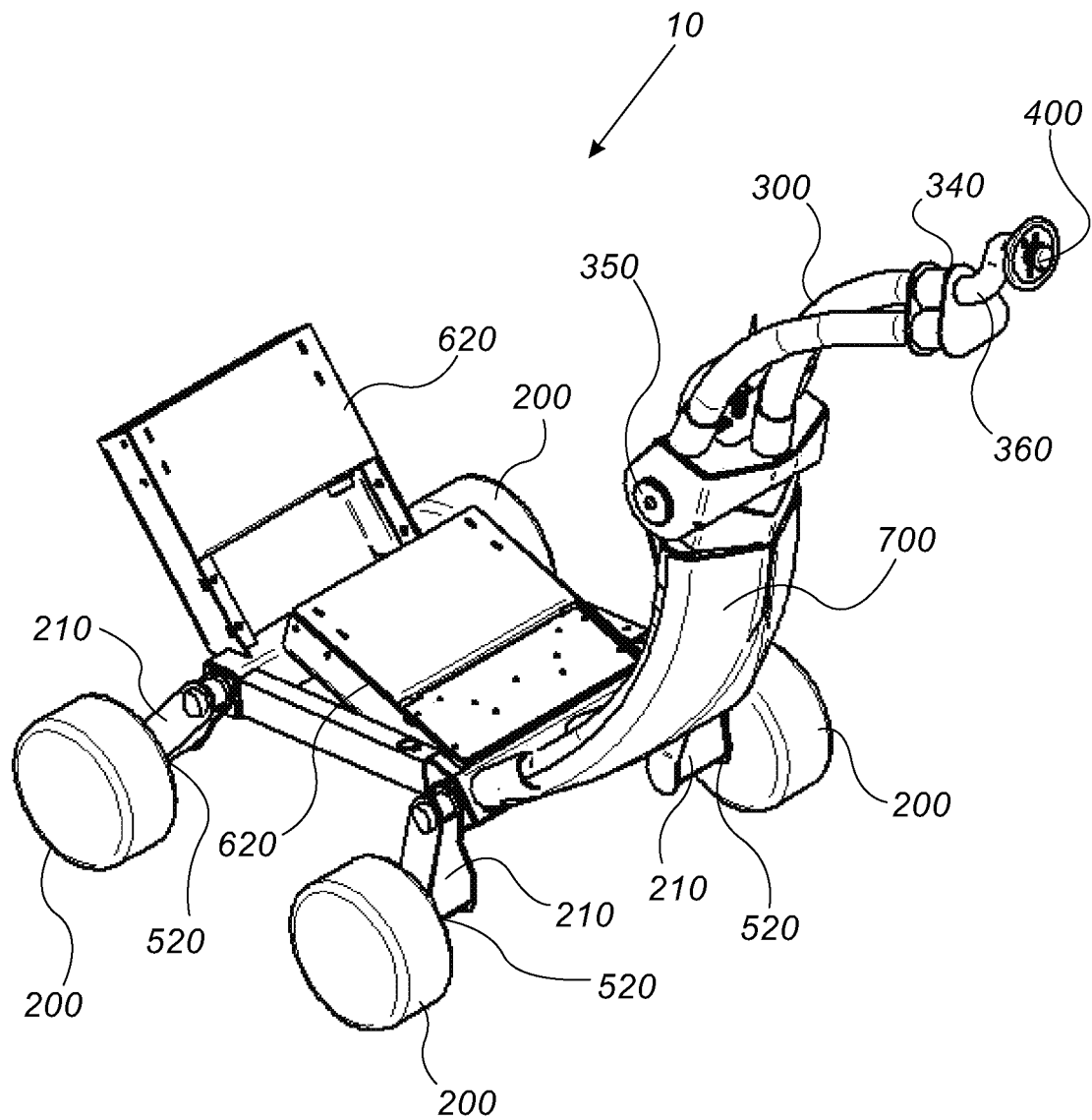
FIG. 13 schematically illustrates, according to an exemplary embodiment, a front perspective view of a carrying device comprising four wheels and two power sources.

FIG. 13 schematically illustrates, according to an exemplary embodiment, a front perspective view of a carrying device comprising four wheels and two power sources.

Figure 14:
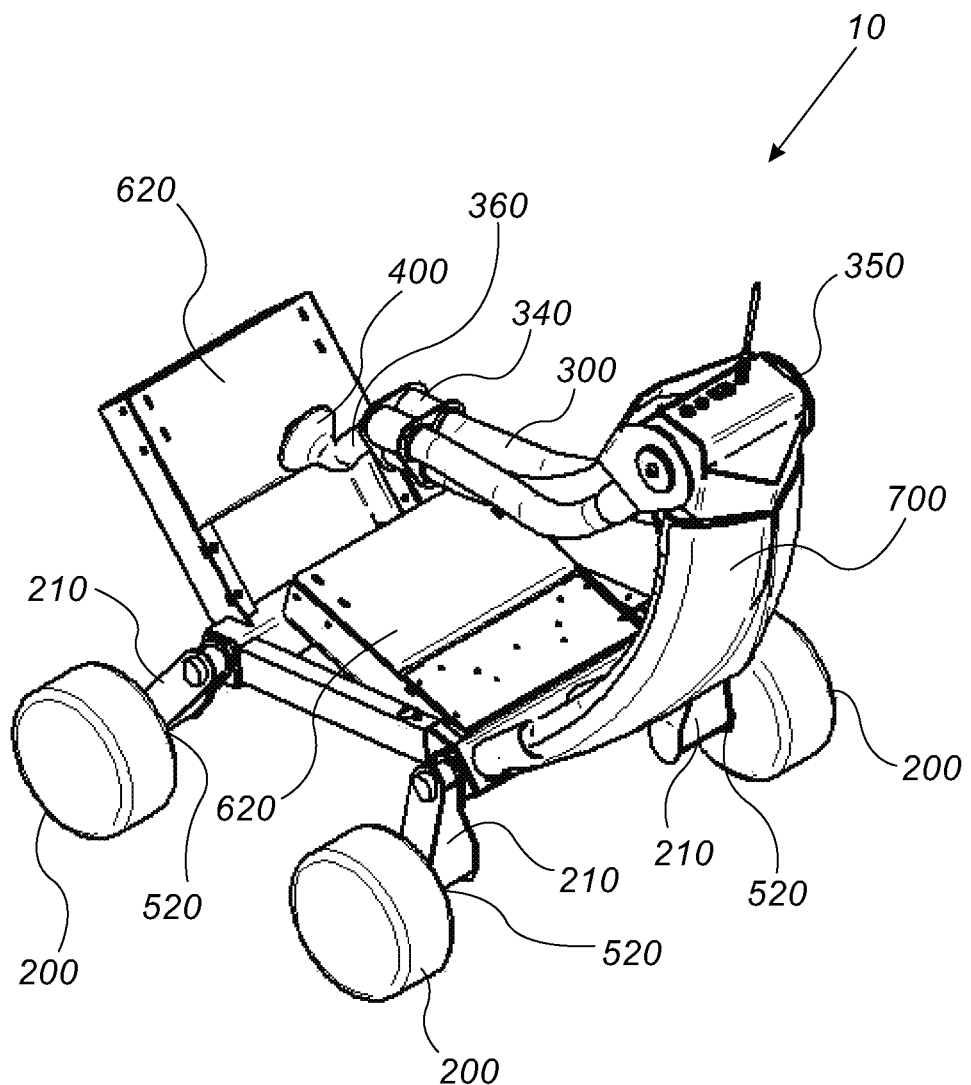
FIG. 14 schematically illustrates, according to an exemplary embodiment, a front perspective view of a carrying device comprising four wheels and two power sources, with a bent shaft.

FIG. 14 schematically illustrates, according to an exemplary embodiment, a front perspective view of a carrying device comprising four wheels and two power sources, with a bent shaft.

According to one embodiment, illustrated for example in FIG. 12-14, the carrying device 10 further comprises a chassis 700 positioned between the bending axis 350 and the at least one wheel 200. The chassis 700 is configured to support the load compartment 100, illustrated for example in FIG. 1.

According to one embodiment, illustrated for example in FIGS. 12-14, the carrying device 10 further comprises at least one wheel arm 210 attached to the chassis 700 and configured to hold a wheel 200, and in some embodiments, a motor 520 as well. According to another embodiment, the wheel arm 210 is alleviated, for example in order to alleviate rocking of the at least one wheel 200, and the entire carrying device 10, due to conditions of a route on which the carrying device 10 is towed.

According to one embodiment, when the carrying device comprises at least one motor 520, the carrying device further comprises at least one power source 620 configured to supply electrical power to the at least one motor 520. Any type of power source 620 known in the art is under the scope of the present subject matter, for example a disposable battery, a rechargeable battery, a rechargeable battery recharged by electricity from the mains, a rechargeable battery recharged by solar energy, a rechargeable battery recharged by the movement of the at least one wheel 200, and the like. Regarding the rechargeable battery recharged by the movement of the at least one wheel 200, when the at least one motor 520 is off, and the carrying device 10 is towed by a person 900, the rolling of the at least one wheel 200 can be exploited to produce electricity, for example by an at least one dynamo that is mechanically connected to the at least one wheel 200. The electricity that is produced by the at least one dynamo is transferred to the at least one power source 620 that is electrically connected to the at least one dynamo.

According to one embodiment, the carrying device 10 further comprises at least one axle, configured to be support at least one wheel 200. As can be seen, for example, in FIG. 12, according to another embodiment, two wheels 200 of the carrying device 10 can be connected to a common axle. According to yet another embodiment, the at least one axle is alleviated, for example in order to allow independency of the wheels 200 connected to the axle, for example in terms of the height of the wheels 200 on the ground one relative to the other. According to a further embodiment, illustrated in FIGS. 13-14, the carrying device 10 comprising two axles—a first axle to which two wheels 200 are connected, and a second axle to which two wheels 200 are connected. It should be noted that the embodiments of the carrying device 10 comprising one or two axles, when two wheels 200 are connected to each axle, are only exemplary. The carrying device 10 can comprise any number of axles, and any number of wheels connected to each axle.

As illustrated in FIG. 12, the carrying device 10 comprises two wheels 200 and one power source 620 electrically connected to the motor 520 of each wheel 200. In addition, as illustrated in FIGS. 13-14, the carrying device 10 comprises four wheels 200 and two power sources, when each power source 620 is electrically connected to the motors 520 of two wheels 200. It should be noted though, that the embodiment of a power source 620 electrically connected to two motors 520, is only exemplary and should not be considered as limiting the scope of the present subject matter. The power source 620 is configured to supply electrical power to any number of motors.

According to one embodiment, the at least one motor 520 is configured to turn the at least one wheel 200 to which the at least one motor 520 is mechanically connected, thus lowering the burden of towing the carrying device 10 by the person 900 towing the carrying device 10.

Actuation and control of the at least one motor 520 are performed by any mechanism known in the art. According to one embodiment, the at least one motor 520 is actuated and controlled by a remote control operated by the person 900 towing the carrying device 10. According to one embodiment, the remote control is signally connected to the at least one motor 520. According to another embodiment, the remote control is signally connected to the motor control unit 540. According to another embodiment, the at least one motor 520 is actuated and controlled by a remote control operated by a person that is not towing the carrying device 510. This embodiment corresponds for example to a carrying device 510 comprising at least three wheels 200, for example four wheels 200, as illustrated in FIGS. 13-14. In order for the carrying device 10 comprising at least three wheels 200, to move there is no need for the carrying device 10 to be towed by a person, but rather move by the at least one motor 520. In this embodiment, the remote control can be operated by a person not towing the carrying device 10. Any type of remote control known in the art is under the scope of the present subject matter, for example a handheld remote control, a remote control that is connected to the at least one motor 520 or to the motor control unit 540 with wires, a remote control that is wirelessly connected to the at least one motor 520 or to the motor control unit 540, and the like.

According to one embodiment, the operation of the at least one motor 520 is actuated and controlled by at least one sensor. The at least one sensor can be positioned on the person 900 towing the carrying device 10, or positioned on the carrying device 10, preferably on the at least one flexible element 360, and signally connected to the motor control unit 540. An exemplary sensor can be a sensor that is configured to sense pulling forces exerted on the at least one flexible element 360. For example, high pulling forces indicated that the carrying device 10 is towed, for example, on an inclined route and the person 900 towing the carrying device exerts a high level force. As a result, when the at least one sensor senses a high pulling force, the at least one sensor transmits a signal to the motor control unit 540, and in turn, the motor control unit 540 increases the power of the at least one motor 520 in order to decrease the burden of towing from the person 900 towing the carrying device 10.

In addition to the ability of the at least one motor 620 to actuate the at least one wheel 200, according to one embodiment, the at least one motor 620 is configured to slow down, or brake, the at least one wheel 200. For example, when there is a need to immediately stop the movement of the carrying device 10. Another example is a carrying device 10 that is towed by a person 900, or moved alone, on a declined route. According to this exemplary embodiment, the at least one motor 620 is configured to slow down, and even completely stop if necessary, the rotation of the at least one wheel 200, in order to decrease the burden of towing from the person 900 towing the carrying device.

It is appreciated that certain features of the subject matter, which are, for clarity, described in the context of separate embodiments, may also be provided in combination in a single embodiment. Conversely, various features of the subject matter, which are, for brevity, described in the context of a single embodiment, may also be provided separately or in any suitable sub combination.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A carrying device comprising:
a load compartment configured to accommodate a load, the load compartment having an upper surface and a lower surface;
at least one wheel rotatably coupled to the load compartment, and configured to roll along a ground;
a shaft attached to the load compartment at the lower surface of the load compartment, the shaft having a first end, a second end, and a bending axis therebetween, the bending axis allowing bending of the second end of the shaft towards the first end of the shaft and the lower surface of the load compartment;
at least one backpack carrying strap attached to the load compartment at the upper surface of the load compartment; and
a coupling element attached to the second end of the shaft, wherein the upper surface of the load compartment faces upwards when the load compartment stands on the at least one wheel on the ground and the lower surface of the load compartment faces the ground when the load compartment stands on the at least one wheel on the ground;
wherein the coupling element is configured to couple the carrying device to a person in a manner that allows towing of the carrying device by the person.

2. The carrying device of claim 1, wherein the load compartment has a goose body-like shape the height of the load compartment is highest substantially at the center of the load compartment and decreases along the length of the load compartment towards both ends of the load compartment.

3. The carrying device of claim 1, wherein the shaft has a goose neck-like shape.

4. The carrying device of claim 1, wherein the coupling element is configured to be attached to an item worn by the person.

5. The carrying device of claim 1, wherein the coupling element is configured to be attached to a back side of the person.

6. The carrying device of claim 1, wherein the shaft is releasably attached to the coupling element.

7. The carrying device of claim 1, wherein the shaft is configured to be attached to the coupling element at a single point.

8. The carrying device of claim 1, wherein the coupling element is a pivot to which the shaft is pivotally connected, in a manner that allows turning of the person in relation to a length of the shaft.

9. The carrying device of claim 1, wherein the shaft comprising alternating rigid and elastic areas.

10. The carrying device of claim 1, wherein the bending axis is configured to be in an open position when the shaft is extended and allows towing of the carrying device by a person, and a closed position when the shaft is bent and allows carrying the carrying device on a back of a person.

11. The carrying device of claim 1, wherein the at least one backpack carrying strap is configured to allow carrying of the carrying device on a person's back.

12. The carrying device of claim 1, wherein the shaft comprises at least one flexible element.

13. The carrying device of claim 12, wherein a flexible element is positioned at an end of the shaft that is configured to attach to the coupling element.

14. The carrying device of claim 1, wherein the shaft comprises at least one rigid element.

15. A system for carrying a load by a person, the system comprising:
a carrying device according to claim 1; and
a harness, configured to be worn by a person, and connect to the coupling element.

16. The carrying device of claim 1 further comprising a hip belt attached to the load compartment at the upper surface of the load compartment, the hip belt configured to be worn by the person when the carrying device is carried on the persons back.

* * * * *